3,089,870
Patented May 14, 1963

3,089,870
PROCESS FOR PREPARING NITROGEN-CONTAINING CELLULOSE DERIVATIVES
John W. Mench and Brazelton Fulkerson, Rochester, N.Y., assignors to Eastman Kodak Company, Rochester, N.Y., a corporation of New Jersey
No Drawing. Filed Jan. 9, 1962, Ser. No. 165,235
5 Claims. (Cl. 260—226)

This invention relates to an improvement in the process of preparing nitrogen-containing cellulose derivatives by reacting chloroacyl esters of cellulose with secondary amines.

U.S. Patent 2,861,068 of Mench and Fulkerson, discloses a process for preparing dialkylaminoacylates of cellulose esters or cellulose ethers which comprises reacting chloroacylated cellulose esters or chloroacylated cellulose ethers with at least two molar equivalents of a secondary amine, based on the chlorine content of the cellulose derivative employed. By using two moles of the secondary amine, there is supplied one mole thereof to replace the chlorine atom of the cellulose derivative and another mole to form amine hydrochloride which is insoluble in the reaction solvent thereby effectively removing the hydrochloric acid liberated. This facilitates forcing the amination reaction to completion, and prevents degradation of the cellulose compound by the liberated acid. The dialkylaminoacylates of cellulose esters or cellulose ethers prepared in accordance with this process are useful in many respects, but suffer from the disadvantage that solutions thereof in organic solvents or in dilute aqueous acids are dark colored. In addition, the process employs relatively large proportions of expensive amines.

The present invention provides a practical improvement in the process of reacting a secondary amine with a chloroacylated cellulose ester or chloroacylated cellulose ether whereby products may be obtained which are free of undesirable color.

One object of our invention is to provide an improved process for preparing dialkylaminoacylates of cellulose esters or cellulose ethers. Another object of our invention is to provide a process for preparing dialkylaminoacylates of cellulose esters or cellulose ethers which are free of undesirable color. Other objects of our invention will appear herein.

We have found that the dialkylaminoacylates of cellulose esters and cellulose ethers may be prepared by reacting a chloroacylated cellulose ester or ether with a secondary amine together with a salt selected from the group consisting of sodium carbonate, sodium bicarbonate, calcium oxide and sodium acetate. The salt effectively removes the hydrochloric acid liberated by the reaction. This prevents degradation of the cellulose compound and facilitates forcing the amination reaction to completion.

When sodium carbonate, sodium bicarbonate or calcium oxide are employed in the reaction, the dialkylaminoacylates of cellulose esters or ethers obtained have excellent color. In addition, the use of these salts is more practical in that the use of amine in excess (that to react with the hydrochloric acid formed by the reaction) may be dispensed with.

When the color of the product is not important, sodium acetate may be employed to react with the hydrochloric acid formed, thereby realizing a more practical method of obtaining the product.

Our invention will be further illustrated by the following examples.

*Example 1*

25 g. of cellulose acetate chloroacetate (8.3% chlorine) was dissolved with stirring in 100 ml. of 1,4-dioxane at steam-bath temperature and 4.62 g. of diethylamine (1.125 mole, based on the chlorine) was added, together with equimolar amount, based on the chlorine, of sodium bicarbonate (5.32 g.), and the reaction conditions were maintained for five hours. The product was separated from solution by precipitation into water, and washed in distilled water until no chlorine could be found in the wash water. After drying, the product was found to contain 28.9% apparent acetyl and 2.08% nitrogen. The product was dissolved in acetone and the color of the solution was water white. A solution of the product is dilute acetic acid was also water white.

*Example 2*

Sodium carbonate was substituted for the sodium bicarbonate in Example 1. The product obtained was similar, and had excellent color.

*Example 3*

Calcium oxide was substituted for the sodium bicarbonate in Example 1. A similar product having excellent color was obtained.

The following example illustrates the use of an excess of amine to react with the hydrochloric acid formed in the reaction (as taught by the prior art).

*Example 4*

25 g. of cellulose acetate chloroacetate (8.3% chlorine) was dissolved with stirring in 100 ml. of 1,4-dioxane at steam-bath temperature. 9.25 g. of diethylamine (2.25 mole, based on the chlorine) was added slowly and the reaction conditions were maintained for 5 hours. The product was separated by precipitation into water, and washed in distilled water until no chlorine could be found in the wash water. After drying, the product was found to contain 29.4% apparent acetyl and 2.06% nitrogen. The color of the product in acetone solution was a light tan. The color of the product dissolved in dilute acetic acid solution was also a light tan.

The following example shows the use of sodium acetate in accordance with our invention.

*Example 5*

Sodium acetate was substituted for the sodium bicarbonate in Example 1. The product obtained was similar to that obtained in Example 1, except that solutions of the product in acetone and dilute acetic acid solutions had poor color characteristics.

The halogen-containing cellulose derivatives which we prefer to use as the starting materials in our process are the cellulose acetate chloroacetates and the ethyl cellulose chloroacetates. Other cellulose derivatives, however, containing acyl and chloroacetyl, chloropropionyl or similar groups, may be employed. The chloroacylation of a cellulose ester or cellulose ether may be accomplished by several methods, such as those outlined in U.S. Patent 2,861,068. Cellulose derivatives which may be employed for preparing halogen-containing derivatives may be lower fatty acid esters of cellulose or cellulose ethers, having free and available hydroxyl groups therein. Some of the materials which may be useful are cellulose acetate having an acetyl content within the range of 30–42%, partially hydrolyzed cellulose acetate propionate or cellulose acetate butyrate or ethyl cellulose having available hydroxyl groups.

The amination reaction is advantageously carried out using an organic solvent such as 1,4-dioxane, methylethyl ketone or acetone. The reaction is conveniently conducted in a mixer, for example a Werner-Pfleiderer mixer, at about 100° C., or the boiling point of the solution when under 100° C. The reaction may be maintained for 4 or 5 hours, or until the chlorine of the cellulose compound has been replaced. Lower temperatures may be employed accompanied by longer reaction times. Alternatively, higher temperatures may be employed by carrying out the reaction in an autoclave, resulting in shorter reaction time.

We prefer to employ amine in about a 10–15% excess over that required to react with the chlorine in the chloroacylated cellulose ester or ether (i.e. about 1.1 to 1.5 mole of amine per mole of chlorine). The amount of amine may be varied from a slight excess of amine, say about 5%, up to about 25% excess of amine, based on the chlorine content. In general, the secondary amines may be employed in the present amination reaction. Some secondary amines which have been found to be suitable for the formation of nitrogen-containing cellulose derivatives include dimethylamine, diethylamine, di-n-propylamine, di-isopropylamine, di-n-butylamine, morpholine, piperidine and the like. Mixed secondary aliphatic amines may also be utilized.

The salts which we employ in our invention are preferably present in amounts of about 1.125 mole, per mole of chlorine, in the chloroacylated cellulose derivative. The amount of salt employed may be varied, but at least one mole of salt should be employed, per mole of chlorine.

The products obtained in accordance with our process possess essentially the same properties as those prepared in accordance with the process disclosed in U.S. Patent 2,861,068, with the exception that products possessing superior color may be obtained in accordance with our invention. In addition, our invention is more practical than those processes involving the use of excess amine in the reaction.

The products prepared in accordance with our invention are especially useful for preparing products where water insolubility and solubility in organic solvents and in dilute aqueous acids is desired. These include films, filaments, sizing agents, stripping layers, anti-static layers, protective colloids and removable coatings such as anti-halation backing layers on photographic film. For instance, the nitrogen-containing cellulose derivative may be compounded with carbon black and used as a backing layer on film. These nitrogen-containing derivatives may be employed as anti-halation backing layers using suitable dyes or carbon dispersions as light absorbers, as described in U.S. Patent 2,801,191 of Nadeau and Thompson.

Filaments or films may be prepared from the nitrogen-containing cellulose derivatives in accordance with our invention by casting or spinning from solutions of those derivatives in organic solvents or in weakly acidic aqueous solutions. For example, cellulose acetate N,N-diethylamino acetate may be dissolved in water containing sulfur dioxide, or 0.5% of acetic acid, or any other combination of water and acid maintaining a pH below about 5.4. The solution thus obtained may be cast upon a coating surface and immediately gelled by immersing the uncured, wet sheet formed thereby in a dilute solution of a base, such as aqueous ammonia or sodium bicarbonate which will raise the pH above 5.4. Curing of the thus gelled cellulose ester sheet may be accomplished rapidly by heating in a current of hot air.

The invention has been described with reference to certain preferred embodiments, it being understood that variations and modifications can be made within the scope of the invention described above and defined in the following claims.

We claim:

1. In a process for reacting a cellulose derivative selected from the group consisting of chloroacylated cellulose esters and chloroacylated cellulose ethers with a secondary amine, the improvement which comprises incorporating in the reaction mixture a salt selected from the group consisting of sodium carbonate, sodium bicarbonate, calcium oxide and sodium acetate.

2. Claim 1 wherein the salt is sodium bicarbonate.

3. Claim 1 wherein the salt is calcium oxide.

4. In a process for reacting cellulose acetate chloroacetate with diethylamine, the improvement which comprises incorporating in the reaction mixture at least one molar equivalent, based on the amount of chlorine present in the cellulose acetate chloroacetate, of sodium bicarbonate.

5. In a process for reacting cellulose acetate chloroacetate with diethylamine, the improvement which comprises incorporating in the reaction mixture at least one molar equivalent, based on the amount of chlorine present in the cellulose acetate chloroacetate, of calcium oxide.

No references cited.